May 31, 1955  MAXIMILIAN (MAX) LEDINEGG  2,709,629
LABYRINTH PACKINGS FOR STRAIGHT-LINE-MOTION MACHINE ELEMENTS
Filed June 14, 1950  3 Sheets-Sheet 1
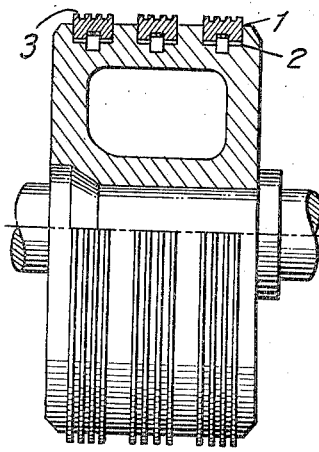
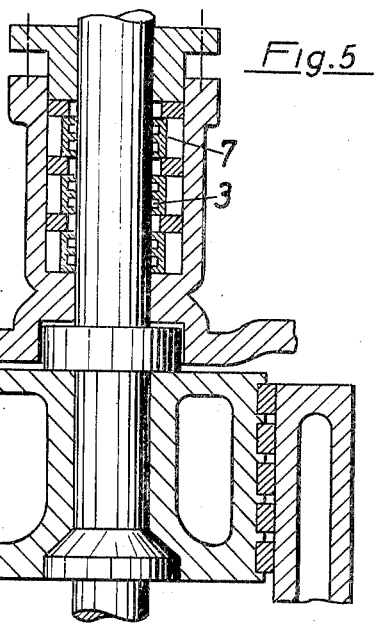
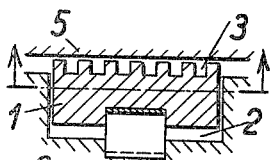
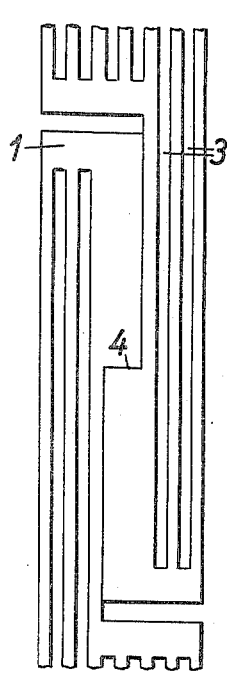
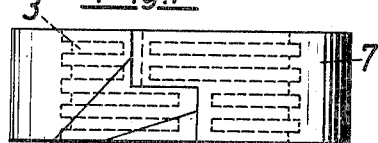
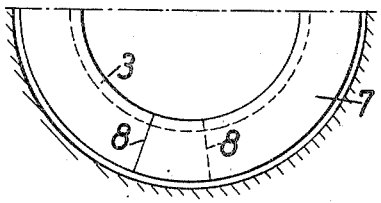
INVENTOR.
MAXIMILIAN (MAX) LEDINEGG
BY

INVENTOR.
MAXIMILIAN (MAX) LEDINEGG

United States Patent Office 2,709,629
Patented May 31, 1955

2,709,629

LABYRINTH PACKINGS FOR STRAIGHT-LINE-MOTION MACHINE ELEMENTS

Maximilian (Max) Ledinegg, Vienna, Austria, assignor of one-half to Simmering-Graz-Pauker Aktiengesellschaft für Maschinen- Kessel- und Waggonbau, Vienna, Austria, a company of Austria Application June 14, 1950, Serial No. 168,121

9 Claims. (Cl. 309—29)

This invention relates to a labyrinth packing for straight-line-motion machine elements, in particular for pistons and stuffing-boxes, against gases and vapours, in which packings a labyrinth and a smooth surface cooperate with the smallest possible contact between them, without contact.

It is known to provide labyrinth gaps for the sealing of pistons, stuffing-boxes, or the like. The known labyrinth packings, however, have the disadvantage that to ensure an adequate reliability of operation, in particular, to avoid any frictional touch, the clearance between the labyrinth and the countersurface must be so large that the leakage losses become inadmissibly high.

According to this invention this drawback is overcome in that self-tightening rings are provided and that the diameter of their labyrinth surfaces is limited by means which limit the self-tightening movement of the rings so that a clearance of the smallest possible width is maintained between the labyrinth and the smooth surface with which it cooperates, whereas the rings are yieldingly seated to permit of their movement in all radial directions without alteration of their diameter.

The accompanying drawings show embodiments of the invention by way of example in Figs. 1 to 12.

Fig. 1 shows by way of example a piston with a labyrinth packing according to the invention, one half of Fig. 1 being a side view, the other half a sectional view.

Fig. 2 is a cross-sectional view, Fig. 3 a top view, and Fig. 4 a partially sectional side view, showing a ring on an enlarged scale.

Fig. 5 is a sectional view showing a piston with piston rod and stuffing-box permitting of the passage of the latter through the cylinder bottom.

Fig. 6 is a cross-sectional view, Fig. 7 a side view, and Fig. 8 an axial view showing on an enlarged scale a self-shrinking packing ring for the stuffing-box.

Figure 9:
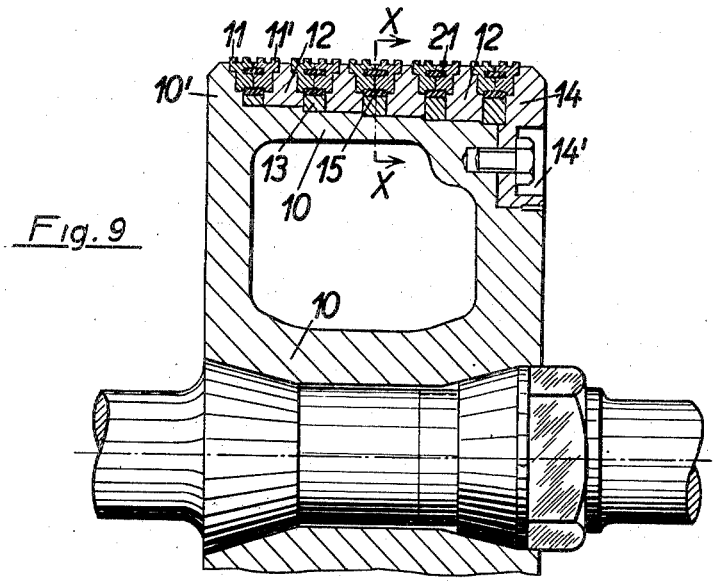
Fig. 9 is an axial sectional view showing another modification of this invention, in conjunction with one half of a piston.

The piston ring 1, which lies in the groove 2 of the piston body with radial play, has labyrinth grooves 3. It is resilient like a common piston ring, but is prevented by the stepped-back portion 4 of the joint from expanding beyond a certain diameter so that a clearance of the smallest possible width is provided between the external surface of the ring and the cylinder wall 5. This clearance is just sufficient to prevent frictional touch of the ring with the cylinder wall. Only in inclined or horizontal cylinders must the rings be centered. This is effected, e. g., as shown in Fig. 4, by means of an undulated leaf spring 9 or the like, which is provided in appropriate annular grooves on the piston ring and on the bottom of the groove 2.

On the packing ring 7 for stuffing-boxes (Figs. 5 to 8), the labyrinth grooves 3 are provided on the inside of the rings 7. These rings tend to shrink under resilient tension, and their accurate internal diameter is limited by the engagement of the surfaces 8 of the joint.

According to a modification of this invention the labyrinth rings consist of two axially adjacent parts, which are so connected with each other as to be capable of axial movement relative to each other, but incapable of radial movement relative to each other.

Figure 10:
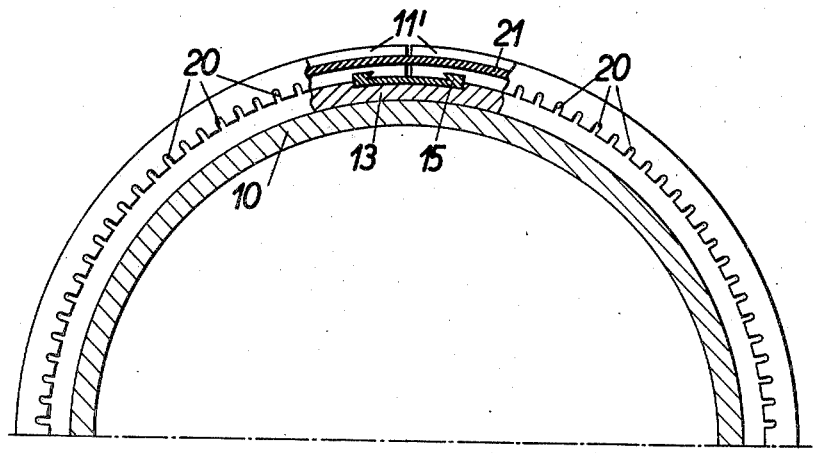
Fig. 10 is an axial view pertaining to Fig. 9.
Figure 11:
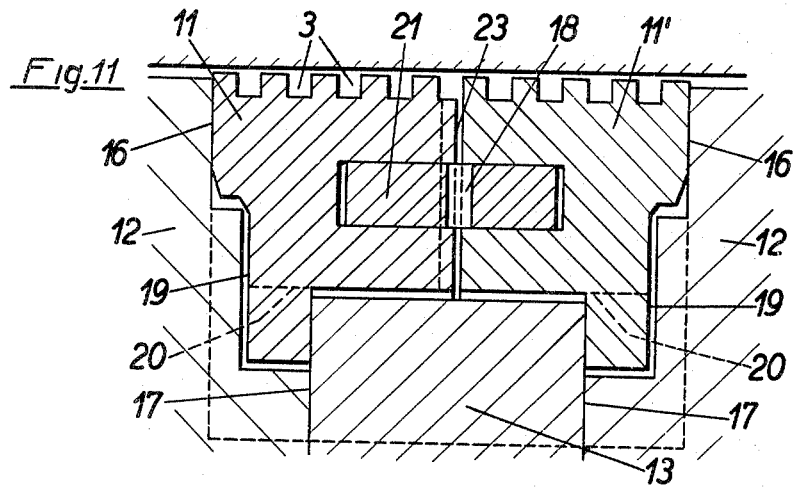
Fig. 11 is a sectional view showing on a greatly enlarged scale a piston ring as shown in Fig. 9.
Figure 12:
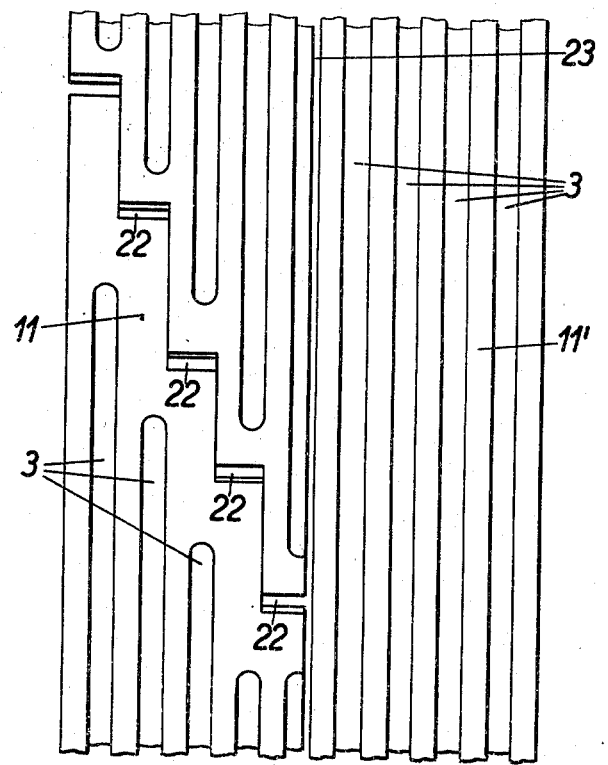
Fig. 12 is a side view showing a portion of such a piston ring.

Fig. 9 is an axial section taken through a portion of a piston, Fig. 10 is a section taken along the line X—X of Fig. 9 through a portion of the ring, and Figs. 11 and 12 show details on a larger scale.

The piston body 10 is substantially smooth. Only at one end has it a stepped annular flange 10'. Rings 12 are passed on the piston body to provide a seat for the pairs of labyrinth rings 11, 11'. The thickness of these rings 12 is stepped similarly as the flange 10'. Rings 13, of smaller outside diameter, are provided between the rings 12 so that seats for the pairs of rings 11, 11' are provided between the rings 12. A cover ring 14, which is stepped symmetrically with the flange 10', is screwed to the piston body by means of screws 14', and holds the rings 12 and 13 together.

Steps of slightly different diameter are provided on the peripheral surface of the piston body 10. The width of these steps is equal to the width of a ring 12 plus the width of a ring 13.

The labyrinth rings 11, 11' are clamped together by means of laterally inserted claw-type interlocking members 15. Considered as a unit, the rings are incapable of axial movement because they engage with the surfaces 16 and 17 (Fig. 11), the distance between which is much smaller than the width of a ring. However, the rings can expand in axial direction and thus approach each other so that the joint 23 is reduced in size. The rings being prevented to move radially relative to each other, by the inserted ring 21, they can move or shrink radially only as a whole so as to be adapted to compensate for differences in diameter and deviations between the axes of the piston and the cylinder. Centering rings 21, which are split so as to be resilient, are inserted in the rings 11, 11' in lateral annular grooves facing each other.

The interlocking member 15, which holds together each of the rings 11, and 11', is somewhat shorter in its circumferential direction than the recess in the labyrinth ring into which it is fitted so that the ring can be compressed. The side faces of the labyrinth rings are so stepped as to engage with the lateral face 16 against the outermost step of the rings 12, and with the lateral face 17 of a recess against the side face of the ring 13. For pressure compensation, the centering rings 21 have a radial bore 18, and the inside surfaces of the labyrinth rings radial recesses 20, so that the pressure medium, such as steam, can pass through the clearance between the rings into the space above the ring 13 and through the recesses 20, shown in a side view in Fig. 11, into the lateral slot 19. As shown in Fig. 12, the labyrinth rings have a multiple-step joint 22. The joints of the two rings are staggered from each other. In this case the rings may also be centered by means which are equivalent to the springs, 9, shown in Fig. 4.

What I claim is:

1. A packing arrangement, comprising in combination, a cylinder member having a smooth cylindrical face, a piston member coaxially arranged with said cylinder member and having a cylindrical surface facing said cylindrical face of said cylinder member, said cylinder and piston members being relatively movable to each other in axial direction thereof; at least one split packing ring having a cylindrical outer sealing surface formed with annular grooves and facing said cylindrical face of said cylinder member and being spaced therefrom for a predetermined distance and another cylindrical surface substantially parallel to said sealing surface, said resilient packing ring having two end portions resiliently tending to move relative to each other in a tangential direction of said split packing ring so as to increase the diameter of said split packing ring and of the cylindrical outer sealing surface thereof; seating means for seating said packing ring on said piston member movable normal to the axis of said piston member; and means for limiting movement of said end portions of said split packing ring in tangential direction when said cylindrical sealing surface of said split ring attains a predetermined diameter, said diameter differing from the diameter of said cylindrical face of said cylinder member by a predetermined amount so that said cylindrical outer sealing surface of said split ring is spaced said predetermined distance from said cylindrical face of said cylinder member.

2. A packing arrangement as claimed in claim 1 wherein said packing ring is composed of a pair of ring members spaced in axial direction from each other, and of a connecting means connecting said ring members for movement together in radial direction and permitting relative axial movement of said ring members; and wherein said seating means have transverse annular faces limiting axial movement of said ring member.

3. A packing arrangement as claimed in claim 2 wherein said ring members have annular faces facing each other and being formed with corresponding annular grooves; and wherein said connecting means is a ring located between said ring members and projecting into said annular grooves of the same.

4. A packing arrangement as claimed in claim 3 in which the centering ring is formed with at least one radial bore and wherein said ring members have inner annular faces formed with slots communicating with said radial bore for compensation of pressure differences between the inside and the outside of said packing ring and with passages for transmitting pressure to a point close to the external rim of said packing ring.

5. A packing arrangement, comprising in combination, a cylinder member having a smooth cylindrical face, a piston member coaxially arranged with said cylinder member and having a cylindrical surface facing said cylindrical face of said cylinder member, said cylinder and piston members being relatively movable to each other in axial direction thereof; at least one split packing ring having a cylindrical outer sealing surface formed with annular grooves and facing said cylindrical face of said cylinder member and being spaced therefrom for a predetermined distance and another cylindrical surface substantially parallel to said sealing surface, said resilient packing ring having two end portions resiliently tending to move relative to each other in a tangential direction of said split packing ring so as to increase the diameter of said split packing ring and of the cylindrical outer sealing surface thereof; groove forming means mounted on said piston member for seating said packing ring on said piston member movable normal to the axis of said piston member; and means for limiting movement of said end portions of said split packing ring in tangential direction when said cylindrical sealing surface of said split ring attains a predetermined diameter, said diameter differing from the diameter of said cylindrical face of said cylinder member by a predetermined amount so that said cylindrical outer sealing surface of said split ring is spaced said predetermined distance from said cylindrical face of said cylinder member.

6. A packing as set forth in claim 5, in which said groove forming means consist of rings of different outside diameter, which are alternatingly clamped together on the piston member beside each other in axial direction.

7. A packing as set forth in claim 5, in which said groove forming means consist of rings of different outside diameter, which are alternatingly clamped together on the piston member beside each other in axial direction, one side face of the packing ring engaging a ring of large diameter, the other side face engaging a ring of small diameter.

8. A packing arrangement comprising, in combination, a first-nonrotatable member having a smooth cylindrical face; a second non-rotatable member coaxially arranged with said first member and having a cylindrical surface facing said cylindrical face of said first member, said cylindrical surface being formed with at least one annular groove having a cylindrical bottom face, said first and second members being movable relative to each other in a rectilinear motion in axial direction thereof; at least one split packing ring mounted in said annular groove of said second member and having a cylindrical sealing surface formed with at least one annular groove and facing said cylindrical face of said first member, and another cylindrical surface substantially parallel to said sealing surface, said cylindrical sealing surface of said packing ring and said cylindrical face of said first member moving relative to each other in axial direction during relative movement of said first and second members, said resilient packing ring having two end portions resiliently tending to move relative to each other in a tangential direction of said split packing ring so as to change the diameter of said split packing ring and to move said cylindrical sealing surface of said packing ring toward said cylindrical face of said first member; resilient means mounted in said groove of said second member between said cylindrical bottom face of said groove and said other cylindrical surface of said split packing ring so as to permit a movement of said split packing ring normal to the axis thereof without change of diameter thereof; and means independent of said first member for limiting movement of said end portions of said split packing ring and for holding said end portions in a position in which said cylindrical sealing surface of said split packing ring has a predetermined diameter and is spaced a predetermined distance from said cylindrical face of said first member whereby a labyrinth seal between said first and second members is obtained.

9. A packing arrangement as claimed in claim 8 wherein said two end portions of said split packing ring are multiple stepped and overlap each other.

References Cited in the file of this patent

UNITED STATES PATENTS

| Number | Name | Date |
|---|---|---|
| 967,247 | Samuelson | Aug. 16, 1910 |
| 1,273,634 | London | July 23, 1918 |
| 1,375,207 | Carrey | Apr. 19, 1921 |
| 1,484,578 | Small | Feb. 19, 1924 |
| 1,535,552 | Small | Apr. 28, 1925 |
| 1,754,625 | Henning et al. | Apr. 15, 1930 |
| 1,876,919 | Groom | Sept. 13, 1932 |
| 2,291,243 | Levy | July 28, 1942 |
| 2,394,408 | Starr | Feb. 5, 1946 |
| 2,433,839 | Ferguson | Jan. 6, 1948 |

FOREIGN PATENTS

| Number | Country | Date |
|---|---|---|
| 22,698 | France (Addition) | Aug. 4, 1921 |
| 472,999 | Great Britain | Oct. 4, 1937 |